US008274908B2

(12) United States Patent
Hsin et al.

(10) Patent No.: US 8,274,908 B2
(45) Date of Patent: Sep. 25, 2012

(54) QUALITY OF SERVICE PACKET PROCESSING WITHOUT EXPLICIT CONTROL NEGOTIATIONS

(75) Inventors: Chih-Fan Hsin, Hillsboro, OR (US); Kapil Sood, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/460,838

(22) Filed: Jul. 24, 2009

(65) Prior Publication Data

US 2011/0019556 A1      Jan. 27, 2011

(51) Int. Cl.
*H04L 12/26* (2006.01)
*H04L 12/66* (2006.01)

(52) U.S. Cl. ........................ 370/252; 370/230; 370/352

(58) Field of Classification Search ........................ None
See application file for complete search history.

(56) References Cited

U.S. PATENT DOCUMENTS

| 6,865,609 | B1 | 3/2005 | Gubbi et al. | |
|---|---|---|---|---|
| 7,245,592 | B2 | 7/2007 | Soomro et al. | |
| 2006/0031374 | A1* | 2/2006 | Lu et al. | 709/207 |
| 2007/0019665 | A1 | 1/2007 | Benveniste | |
| 2007/0025325 | A1 | 2/2007 | Kumar | |
| 2007/0136372 | A1* | 6/2007 | Proctor et al. | 707/104.1 |
| 2007/0171822 | A1* | 7/2007 | Tse-Au | 370/231 |
| 2008/0057970 | A1* | 3/2008 | Takada et al. | 455/450 |
| 2009/0010259 | A1* | 1/2009 | Sirotkin | 370/392 |
| 2009/0175373 | A1* | 7/2009 | Kwon et al. | 375/260 |
| 2010/0091650 | A1* | 4/2010 | Brewer et al. | 370/229 |
| 2010/0098417 | A1* | 4/2010 | Tse-Au | 398/45 |
| 2010/0135287 | A1* | 6/2010 | Hosain et al. | 370/389 |
| 2010/0189024 | A1* | 7/2010 | Xhafa et al. | 370/311 |

FOREIGN PATENT DOCUMENTS

| JP | 2003087300 A | 3/2003 |
|---|---|---|
| WO | 2011/011311 A2 | 1/2011 |
| WO | 2011/011311 A3 | 1/2011 |

OTHER PUBLICATIONS

International Search Report and Written Opinion Received for PCT Patent Application No. PCT/US2010/042416, mailed on Feb. 7, 2011, 10 pages.

* cited by examiner

*Primary Examiner* — Chi Pham
*Assistant Examiner* — Soon-Dong Hyun
(74) *Attorney, Agent, or Firm* — Schubert Law Group PLLC (57) ABSTRACT

Apparatuses, methods, systems, and computer program products to process QoS packets of wireless traffic without explicit control negotiations are disclosed. An embodiment may comprise a mobile computing device with wireless communications capabilities. The mobile computing device may be a client that associates or connects with an access point or communicates another client device, such as a peripheral device with wireless capabilities. The mobile computing device may monitor wireless packet traffic being transmitted from the mobile computing device. For example, the mobile computing device may monitor the packets being transmitted from a video streaming application to the peripheral device, which may comprise an LCD monitor that has wireless communications capabilities. The mobile computing device may mark the packets of the video stream as QoS packets even though the video streaming application may not do so, and place the marked packets in a QoS queue for priority processing.

20 Claims, 7 Drawing Sheets

QUALITY OF SERVICE PACKET PROCESSING WITHOUT EXPLICIT CONTROL NEGOTIATIONS

FIELD

The present disclosure relates generally to the field of communications. More particularly, the present disclosure relates to quality of service (QoS) processing of wireless traffic without explicit control negotiations.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

The following is a detailed description of novel embodiments depicted in the accompanying drawings. However, the amount of detail offered is not intended to limit anticipated variations of the described embodiments; on the contrary, the claims and detailed description are to cover all modifications, equivalents, and alternatives falling within the spirit and scope of the present teachings as defined by the appended claims. The detailed descriptions below are designed to make such embodiments understandable to a person having ordinary skill in the art.

Generally speaking, systems, apparatuses, methods, and computer program products to process QoS packets of wireless traffic without explicit control negotiations are contemplated. An apparatus embodiment may be a mobile computing device with wireless communications capabilities. The mobile computing device may be a client that associates or connects with an access point and communicates with the access point. Alternatively, or additionally, the mobile computing device may be a client device that communicates with another client device, such as a peripheral device with wireless capabilities.

After establishing a communications link with the access point or the other client device, the mobile computing device may monitor wireless packet traffic being transmitted from the mobile computing device. For example, the mobile computing device may monitor the packets being transmitted from a video streaming application to the peripheral device, which may comprise a liquid crystal display (LCD) monitor that has wireless communications capabilities. The mobile computing device may identify the stream from the video streaming application as a QoS data traffic stream, mark the packets of the video stream as QoS packets even though the video streaming application may not do so, and place the marked packets in a QoS queue for priority processing.

Various embodiments disclosed herein may be used in a variety of applications. Some embodiments may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.16e, 802.20, 3 GPP Long Term Evolution (LTE) etc. and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Extended TDMA (E-TDMA), Code-Division Multiple Access (CDMA), Multi-Carrier Modulation (MDM), Discrete Multi-Tone (DMT), Bluetooth®, ZigBee™, or the like. Embodiments may be used in various other apparatuses, devices, systems and/or networks.

While some of the specific embodiments described below will reference the embodiments with specific configurations, those of skill in the art will realize that embodiments of the present disclosure may advantageously be implemented with other configurations with similar issues or problems.

Figure 1:
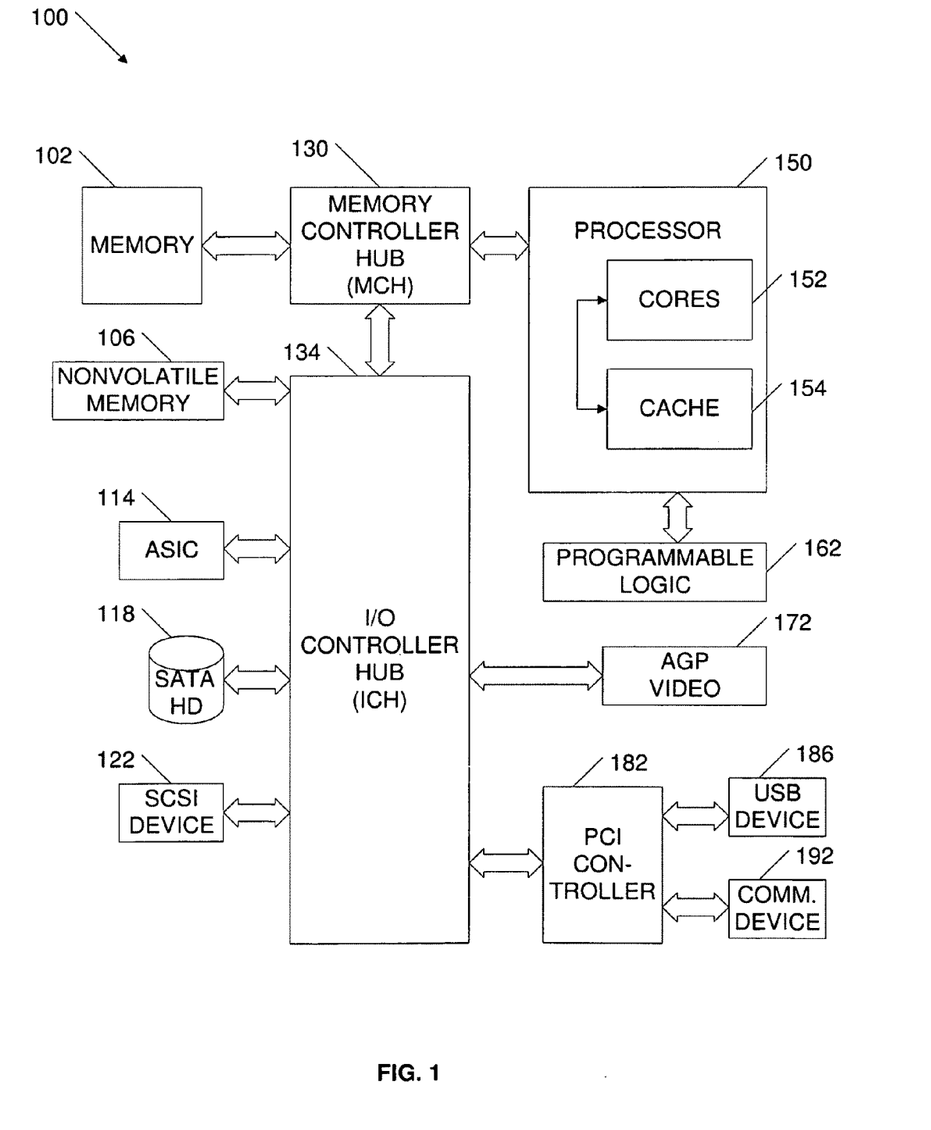
FIG. 1 depicts an embodiment of a system that may be configured to process QoS packets for wireless traffic without explicit control negotiations.

Turning now to FIG. 1, there is shown an embodiment of a system 100 with a processor 150, a memory controller hub (MCH) 130, memory 102, and an I/O controller hub (ICH) 134. In some embodiments system 100 may comprise a computer system, such as a notebook or a desktop computer. In other embodiments system 100 may comprise a different type of computing apparatus, such as a palmtop computer, a personal digital assistant (PDA), or a mobile computing device, as examples. System 100 may process QoS packets for wireless traffic without explicit control negotiations via, e.g., communications device 192.

Processor 150 may have one or more cores 152 coupled with cache 154. For example, processor 150 may have four cores coupled with internal processor cache memory. Processor 150 may execute operating instructions for programs and applications executed by users of system 100, such as instructions of a word processing application, a computer aided design (CAD) application, a file-transfer protocol (FTP) application, or a web browser, as just a few examples. Such software programs and related instructions may be stored in memory 102. The software programs may generate packets of data to be transmitted wirelessly. Some of the packets for one or more of the programs may need priority handling, in order to provide an acceptable experience by a user of system 100, such as an audio or video streaming application. In other words, if the data of the streaming applications are not wirelessly transmitted before the traffic of other applications that processor 150 may be executing, the result may be choppy video and/or audio.

Processor 150 may execute the instructions in memory 102 by interacting with MCH 130. The types of memory devices comprising memory 102 may vary in different embodiments. In some embodiments, memory 102 may comprise volatile memory elements, such as two 1-gigabyte (GB) dynamic random access memory (DRAM) sticks. In other embodiments, memory 102 may comprise nonvolatile memory. For example in some embodiments memory 102 may comprise a flash memory module, such as a 4 GB flash memory card.

ICH 134 may allow processor 150 to interact with locally coupled external peripheral devices, such as keyboards, scanners, and data storage devices. Programs and applications being executed by processor 150 may interact with the external peripheral devices. Processor 150, memory 102, and the various devices coupled to ICH 134 may all consume various amounts of power. To conserve power, system 100 may perform various platform-level power management activities, based on the NNQ traffic, and enter one or more various modes to save or conserve power. For example, in at least one embodiment, system 100 may shut down three cores of cores 152 and only run on one core of processor 150 to conserve power. System 100 may be able to conserver power based on the activities of applications being executed and/or the activities of devices, such as communications device 192.

System 100 may conserve power by switching one or more cores of cores 152 to different power levels, based on the activities of the applications and/or communications device 192. For example, in one embodiment each core of cores 152 may be operated within six different power levels. A first power level may be referred to as "Power Level 0", a second power level referred to as "Power Level 1", and so on up to "Power Level 5" for a sixth power level. These different power levels are for one embodiment.

Other embodiments may have more or fewer predefined power levels and/or power saving modes. In some embodiments, the power switching may be accomplished via interactions of processor 150 and communications device 192. For example a pattern classification algorithm executed by processor 150 in a driver of communications device 192 may enable processor 150 and other chipsets of system 100 to switch to other sleep states, such as advanced configuration and power interface (ACPI) "Cx" states, and/or to change power-adjusted frequency states, which may be referred to as "P-states".

When operating at one power level, such as Power Level 5, a core may be operating in a relatively unrestricted fashion. In other words, the power level may provide the core with all the power that it needs to process instructions and prepare data for wireless transmission as rapidly as the core is able. Operating unrestricted in such a manner, however, may result in the core consuming large quantities of current and associated power. Conversely, when a core operates at a different power level, such as Power Level 0, it may operate much more slowly and process far fewer instructions than Power Level 5. Operating in this more restricted mode may allow the core to operate using a much smaller current. However, operating more slowly may result in the performance of the core being reduced. For example, if all cores of cores 152 operate at Power Level 1 or lower, system 100 may not be able to support certain operations of system 100, such as the continual operation of communication device 192. System 100 may, however, buffer data which may later be transferred to another device when system 100 switches to a different power level and provides data to communications device 192 for transmission. System 100 may buffer the data when, e.g., communications device 192 processes lower priority, non-QoS, data traffic.

Processor 150 may present information to a user via a display device coupled to Advanced Graphics Port (AGP) video card 172. For example, the type of display device may be a cathode-ray tube (CRT) monitor, an LCD screen, or a thin-film transistor flat panel monitor. To conserve power in one or more embodiments, system 100 may disable or otherwise switch video card 172 and/or the display device into a low power mode based on the activities of applications and/or communications of communications device 192. Worth emphasizing, in various embodiments, system 100 may conserve power by selectively shutting some down devices while leaving other devices operating. For example, communications device 192 may comprise a wireless network interface card (WNIC), with system 100 comprising a notebook computer. The notebook computer may disable or switch communications device 192 into a power saving mode, yet still execute an application and display results of the application to a user via video card 172. The form of communications device 192 may vary in different embodiments. For example, instead of comprising a WNIC, communication device 192 may comprise a network interface card (NIC).

As alluded to above, ICH 134 may allow processor 150 to store and retrieve data from USB device 186 via a Peripheral Component Interconnect (PCI) controller 182. For example, processor 150 may transmit and retrieve data via USB device 186 while running an application, such as when USB device 186 comprises a wireless communications card coupled to system 100 via a USB port. To conserve power, system 100 may enter a doze state, or alternatively a lower power level mode, which disables the wireless communications card of USB device 186.

In addition to USB device 186 and communications device 192, ICH 134 may also interact with Advanced Technology Attachment (ATA) devices, such as ATA hard drives, compact disc (CD) drives, and digital versatile disc (DVD) drives. As shown in FIG. 1, system 100 may have a serial ATA (SATA) hard drive 118 coupled to ICH 134. SATA hard drive 118 may be used to store an operating system, device drivers, and application software for system 100. For example, in some embodiments SATA hard drive 118 may store a Linux®, a Unix®, a Macintosh® OS X, a Windows® or some other operating system. Additionally, when system 100 enters a power saving mode, SATA hard drive 118 may store state data so that system 100 may restore machine state using the saved data upon exiting the power saving mode. For example, SATA hard drive 118 may store state data comprising register values, cache data, contents of memory 102, and data pertaining to previously established links with one or more stations of a peer-to-peer network.

ICH 134 may store and retrieve information in nonvolatile memory 106, as well as interact with an application specific integrated circuit (ASIC) 114. For example, nonvolatile memory 106 may comprise flash memory in some embodiments while comprising programmable read-only memory (PROM) or another type of memory in other embodiments. In embodiments where nonvolatile memory 106 comprises flash memory, system 100 may store state information before entering a power saving mode and load the state information upon exiting the power saving mode. In embodiments where nonvolatile memory 106 comprises PROM, nonvolatile memory may be used, e.g., to store operating instructions for system 100. For example, nonvolatile memory 106 may store operating instructions when system 100 comprises, e.g., a mobile device such as a cellular telephone.

In one or more embodiments, ASIC 114 may work in conjunction with processor 150 and/or communication device 192. For example, system 100 may comprise a secure communication device, wherein ASIC 114 performs such functions as encryption and decryption of data transmitted and received via system 100. Upon entering a power saving mode, ASIC 114 may retain current state information of a communications link which system 100 may have established with another system or client device, such as a current set of encryption keys, by saving the information in a nonvolatile memory section of ASIC 114, in nonvolatile memory 106, or SATA hard drive 118, as examples. Upon exiting the power saving mode, ASIC 114 may retrieve the state information and use it to communicate with the other system or client device over the communications link.

In some embodiments ICH 134 may store and retrieve data using a Small Computer Systems Interface (SCSI) device 122. In such embodiments, system 100 may retain current state information for a communications link which system 100 may have established with another system, such as state information of processor 150 and memory 102, by saving the information in to a storage device coupled to SCSI device 122 before entering a power saving mode. Upon exiting the power saving mode, system 100 may retrieve the state information from the storage device of SCSI device 122 and use the state information to continue communicating with the other system over the communications link. In even further alternative embodiments, SCSI device 122 may comprise a communication device, such as a wireless communications card. In such embodiments, system 100 may use the wireless communications card to establish a communications link with, e.g., an access point or other station.

System 100, in other alternative embodiments, may comprise other types of hardware not depicted in FIG. 1, such as a sound card, a scanner, and a printer, as examples. Conversely, in different embodiments, system 100 may not comprise all of the elements of the embodiment shown in FIG. 1. For example, numerous embodiments of system 100 may not comprise SCSI device 122, SATA hard drive 118, USB 186, and ASIC 114. Additionally, the embodiment of system 100 employing MCH 130 and ICH 134 may differ in other alternative embodiments. That is to say, alternative embodiments may employ other types of bus and/or hub arrangements.

System 100 may comprise a client in a wireless network. For example, system 100 may comprise a laptop 260 in a communications network 200, depicted in FIG. 2, wherein communications network 200 comprises a WLAN that conforms to an IEEE 802.11 standard, such as the 2007 version (see http://standards.ieee.org/getieee802/download/802.11-2007.pdf). Embodiments described herein may enable two IEEE 802.11-2007 devices, such as laptop 260 and access point 230, to apply Quality of Service channel priority to egress traffic, traffic leaving the device, without performing any explicit QoS negotiations and counter negotiations. An embodiment may employ a scheme that classifies egress packets based on a number of criteria, described herein, to transmit the packets via different WLAN QoS queues. As a result, the scheme may extend the IEEE 802.11-2007 standard.

Figure 2:
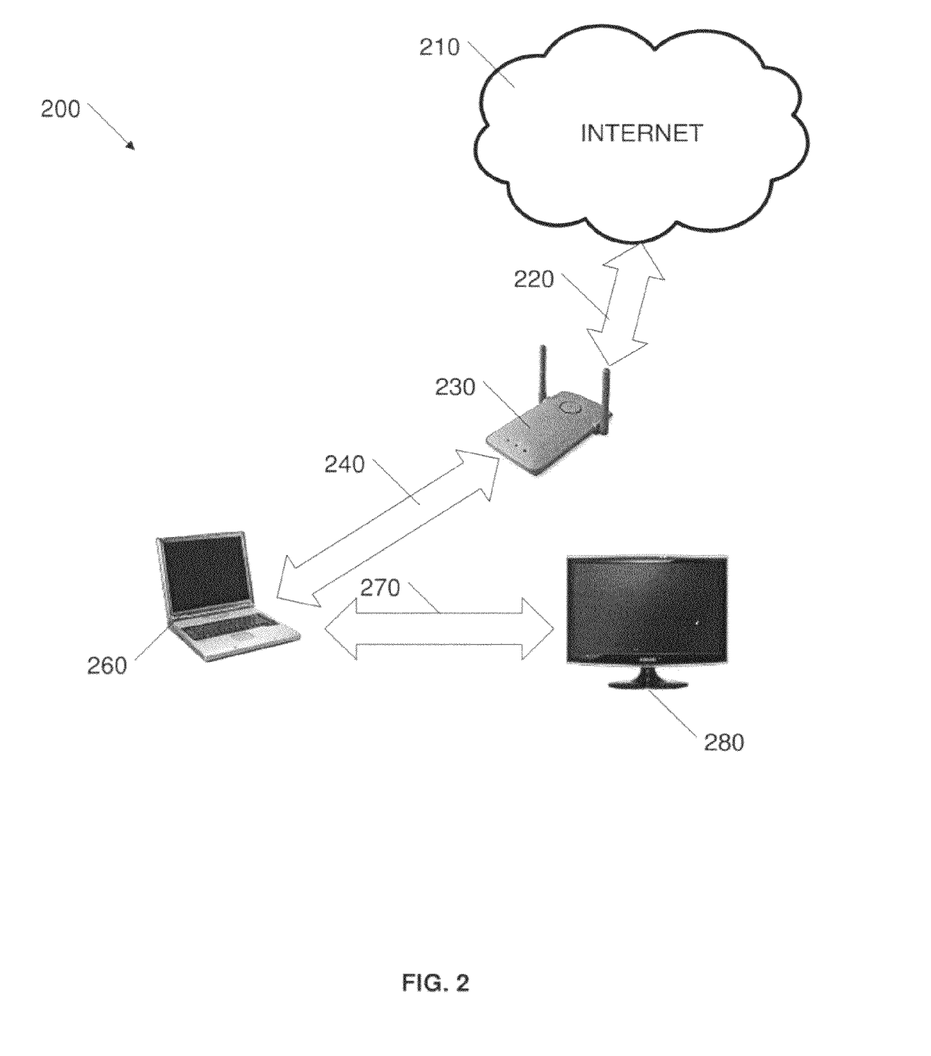
FIG. 2 depicts an embodiment of a laptop that processes QoS packets in a wireless network.

Laptop 260 may communicate with wireless display 280 and/or access point 230. Access point 230 may be coupled with the Internet 210 via communications link 220. Using communications link 240 and the connectivity provided by access point 230, laptop 260 may access the Internet 210. The type of data content laptop 260 transfers between access point 230, wireless display 280, or other networking devices may vary greatly in different embodiments as well as in the same embodiment.

Laptop 260 and wireless display 280 may also be communicating in a peer-to-peer mode, with wireless display 280 and laptop 260 communicating with each other over direct link 270. That is to say, laptop 260 may transmit data directly to wireless display 280, without relying on access point 230. For example, a user of laptop 260 may want to play a Blu-ray™ disc movie via wireless display 280. Laptop 260 may transmit the video and audio information of the movie from a multimedia application directly to wireless display 280, without the need for routing the video information through access point 230. Additionally, while playing the movie, the user of laptop 260 may call someone by way of voice over IP (VoIP) through access point 230. Additionally, the user of laptop 260 may concurrently send an e-mail or download a file by way of access point 230.

As one skilled in the art will appreciate, different applications have different requirements on the networking traffic data rate, delay, jitters, and other network communication specifications. To provide quality of service packet processing, networking traffic of communications network 200 could be classified and given different priorities to access the shared transmission medium. For example, the video and audio traffic between laptop 260 and wireless display 280 may generally need a higher priority than file-download traffic between laptop 260 and access point 230. Otherwise, if the file-download traffic consumes too much of the wireless bandwidth, the user may experience choppy or otherwise distorted audio/video playback from wireless display 280.

In WLAN standards, 802.11e and Wi-Fi Multimedia™ (WMM®) have been established to satisfy demanding wireless communication requirements. To enable QoS packet processing in the 802.11e and WMM® schemes, a networking application running at a wireless station generally needs to mark the time-sensitive networking packets as QoS packets. The 2007 standard defines explicit QoS features for bi-directional wireless traffic, such as data transmitted wirelessly between laptop 260 and access point 230. For example, a networking application of laptop 260 may mark audio-video packets to be transmitted to wireless display 280 as video packets.

However, to process QoS traffic according to the 2007 standard, laptop 260 and access point 230 may generally need to conduct complex negotiations to establish various QoS parameters, such as various traffic specification/traffic classification (TSPEC/TCLAS) parameters. Additionally, laptop 260 generally must configure the WLAN driver(s) to give effect to the negotiated parameters via application and operating system (OS) APIs (application programming interfaces). Establishing the QoS connection will help ensure the audio-video packets transmitted to wireless display 280 receive priority over other network traffic, such as the file-download traffic between laptop 260 and access point 230.

The QoS scheme according to the 2007 standard for 802.11 has not been widely accepted in commercial products. Video and voice applications, such as Skype™, YouTube, and Cisco™ softphone are generally configured to be generic and work independently across QoS and non-QoS WLAN drivers, so the applications do not incorporate the QoS API for negotiation. In other words, most networking applications do not mark packets for QoS. Therefore, all the networking packets originating from multiple web, audio, video, and voice applications on the same client are most often treated the same, which are treated as WLAN "best effort" (BE) packets by default. As a result, applications may experience poor conditions on wireless networks, causing poor user experience on general purpose clients. Further, the WLAN QoS standard definition only applies to communications between an access point and a client. The WLAN QoS standard does not address client-to-client communications. In other words, the standard does not address communications like direct link 270 between laptop 260 and wireless display 280.

Another reason the QoS scheme according to the 2007 standard has not been widely accepted is due to excessive channel bandwidth usage related to the QoS negotiations. Usage data shows that WLAN channels frequently experience excessive QoS negotiations and counter-negotiations between the client and access point, effectively deteriorating the channel further by flooding management traffic. As a result of the excessive design, implementation, and configuration complexity, most clients no longer enable the QoS features.

Instead of implementing QoS according to the 2007 standard, an embodiment may implement QoS for transmitting various packets without conducting complex negotiations to establish various TSPEC/TCLAS and other QoS parameters. An embodiment, which may have a prioritization engine within laptop 260, may segregate the packet streams sent by applications of laptop 260. In segregating the packet streams, the embodiment may determine that certain traffic streams have traffic patterns which match the traffic patterns of certain MPEG2/MPEG4, high definition (HD), or web applications.

Figure 6A:
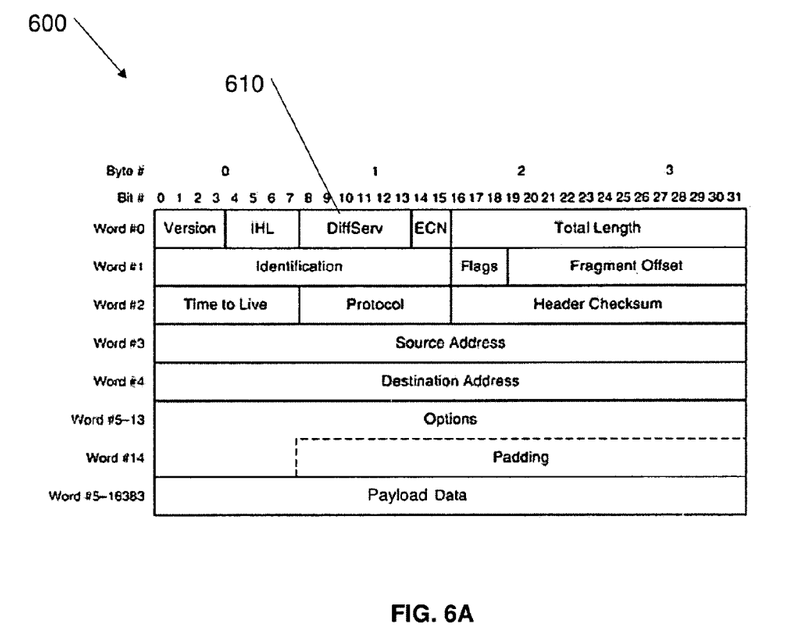
FIG. 6A depicts an Internet protocol (IP) packet format according to numerous embodiments.

Upon determining that one or more of the traffic streams match the traffic patterns of known applications, the engine may classify the different packet streams for different treatment, with some streams receiving QoS priority treatment. The engine may mark the packets belonging to the different QoS streams, such as by setting bits of the "Differentiated Services" (DiffServ) field 610 in the header information of the IP packet 600. DiffServ field 610 may indicate the level of service that the packet should receive when handled or processed by each router or station along the network transmission path. Each of the possible values of DiffServ field 610 may be mapped to a QoS policy, with each mapping being called a differentiated services codepoint (DSCP). After the prioritization engine marks the packets belonging to the different QoS streams, the prioritization engine may then process the streams differently than other BE packets, placing the packets of the QoS streams into one or more QoS priority queues for transmission.

The types of devices in communication network 200 may vary in different embodiments. For example, in one alternative embodiment laptop 260 may comprise an ultra-mobile personal computer (UMPC). In other alternative embodiments, laptop 260 may comprise a Mobile Internet Device (MID) or a smartphone. Wireless display 280 may comprise another type of peripheral device with wireless communications capabilities, such as a home stereo having built-in wireless communications capabilities that enable the stereo to receive and play streaming audio.

In an even further embodiment, laptop 260 may comprise a desktop computer employing an internal wireless NIC to communicate with wireless display 280 and/or access point 230. Communications network 200 may comprise one of a variety of different 802.11 stations. Many embodiments may affect the packets that are sent between an access point and a client. Other embodiments may affect the packets that are sent between one client and another client.

In the discussion for FIG. 2, communications network 200 was described as a WLAN that conforms to an IEEE 802.11 standard, but for an alternative embodiment communications network 200 may also comprise a GSM mobile communication network. Further, in other alternative embodiments, other data transmission solutions, such as the packet switched data transmission system GPRS (General Packet Radio Service) of the GSM system and LPRF (Low Power RF) based on a low power radio signaling, may be applied in connection with the alternative embodiments. In even further alternative embodiments, the stations of communications network 200 may employ other wireless technologies, such as 802.16, 3G, or 4G.

A single laptop and peripheral device, as depicted in FIG. 2, may illustrate one scenario or arrangement of a communications network 200. In other embodiments, communication network 200 may have more devices involved in client-to-client (peer-to-peer) communications and/or access point-to-client communications. For example, laptop 260 may mark packets for QoS processing when communicating with wireless display 280 over direct link 270 and communicating with another mobile device over an additional direct link.

Figure 3:
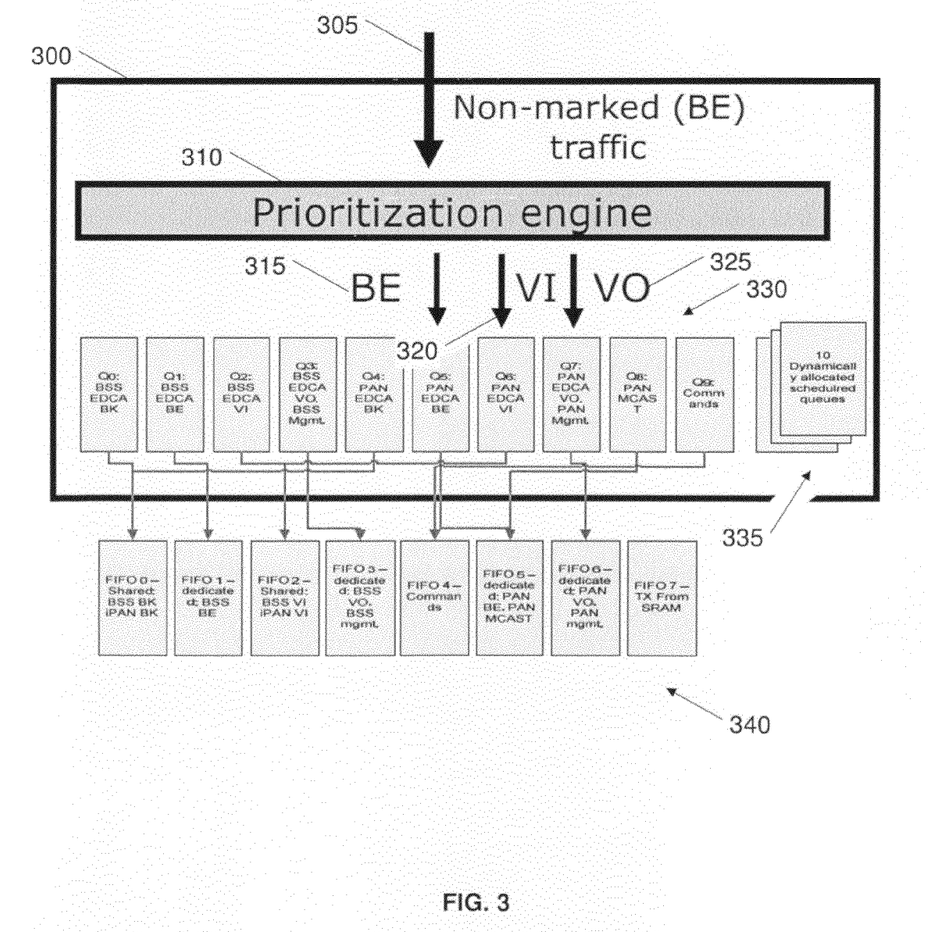
FIG. 3 illustrates how a prioritization engine may implement a Non-Negotiated QoS (NNQ) scheme and process QoS packets via a driver of a wireless network adapter.

To illustrate in further detail how laptop 260 or other wireless communication device may process QoS packets of wireless traffic without explicit control negotiations, we turn now to FIG. 3. FIG. 3 illustrates how a prioritization engine 310 may implement a Non-Negotiated QoS (NNQ) scheme and process QoS packets via a wireless network adapter driver 300. That is to say, one or more embodiments may implement prioritization engine 310 at the level of a network adapter driver. The network adapter controlled by driver 300 may support one or more standard communications protocols, such as standards of the IEEE 802.11e or the Wi-Fi Alliance (WMM®). Supporting one or more of the standards, the network adapter may receive a packet marked as a QoS packet and route the packet according to the corresponding QoS-category transmission queues, in the packet transmission path. For example, the network adapter may receive video (VI) packets or voice (VO) packets with corresponding QoS access categories from driver 300 and route the packets according to the VI or VO QoS access categories, using respective VI or VO transmission queues, respectively.

Prioritization engine 310 may receive the unmarked network packets (element 305) from applications executing on a wireless station. By way of example, with reference to FIG. 2, laptop 260 may be executing numerous applications and using wireless communications to communicate with wireless display 280 and access point 230. A user of laptop 260 may be using a multimedia application to play a DVD on wireless display 280. At the same time, the user may be talking to someone over Internet 210 via a VoIP application, downloading a file using an FTP application, and having an e-mail application execute in the background of laptop 260 which periodically communicates with an e-mail server of Internet 210.

Without having formal negotiations for QoS prioritization of the wireless packets from the multimedia, VoIP, FTP, and e-mail applications, a prior art version of laptop 260 may treat all packets from each of the applications with equal priority and employ a WLAN "Best Effort" scheme to transmit the packets. Contrastingly, a laptop employing prioritization engine 310 may implement a set of policies and criteria for traffic-flow classification, for outgoing traffic, without the need for formal negotiations. According to an embodiment, prioritization engine 310 may receive the packets from the applications which need to be transmitted (element 305). Prioritization engine 310 may segregate the packet streams sent by the applications. For example, prioritization engine 310 may segregate the streams of packets from the multimedia, VoIP, FTP, and e-mail applications.

Using one or more mechanisms, prioritization engine 310 may identify one or more of the traffic streams, such as recognizing that a stream has traffic patterns which match a specific application. An example would be prioritization engine 310 recognizing that a stream from the multimedia application, being transmitted to wireless display 280 via link 270, matches a MPEG2/MPEG4 audio-video stream. The prioritization engine 310 may further determine that a stream from the VoIP application matches a voice application stream, and determine that the FTP and e-mail streams match web application streams.

Prioritization engine 310 may also classify the different packet streams for appropriate QoS processing. For example, upon determining that several of the transmitted streams match video and voice applications which cannot tolerate delayed transmission for acceptable user performance, prioritization engine 310 may classify packets for the video and voice applications as having higher transmission priorities than the web applications. According to the determined classifications and priorities, prioritization engine 310 may mark packets which belong to the different streams. For example, prioritization engine 310 may mark packets belonging to the DVD multimedia application and the VoIP application, enabling these applications to receive priority treatment, yet leave packets of the web applications unmarked for BE processing, or marked with an alternative priority specification/classification for differentiated processing.

Wireless network adapter driver 300 may process the QoS-marked packets for the video stream 320 and voice stream 325, as well as process packets of the best effort stream 315, using different transmission queues 330, dynamically allocated queues 335, and various first-in first-out (FIFO) buffers 340, according to the marked QoS access categories. In other words, driver 300 may associate different transmission queues 330 with different priorities to access the shared transmission medium, which provides differentiated QoS. That is to say, driver 300 may process packets of the video stream 320 and voice stream 325 using queues 330 and FIFO buffers 340 that give the video and voice packets priority over packets of the BE stream 315, transmitting the video and voice packets with less delay than the BE packets.

FIG. 3 illustrates how an embodiment may receive packets previously undifferentiated and unmarked for any QoS processing. In examining FIG. 3 and the accompanying discussion, one may appreciate how an embodiment may extend the functionality of wireless drivers by providing differentiated QoS for outgoing (egress) network traffic. Embodiments may provide such differentiated QoS capability without requiring specific application support. In other words, an embodiment may process packets with QoS prioritization without having the applicants mark packets as QoS packets.

Figure 4:
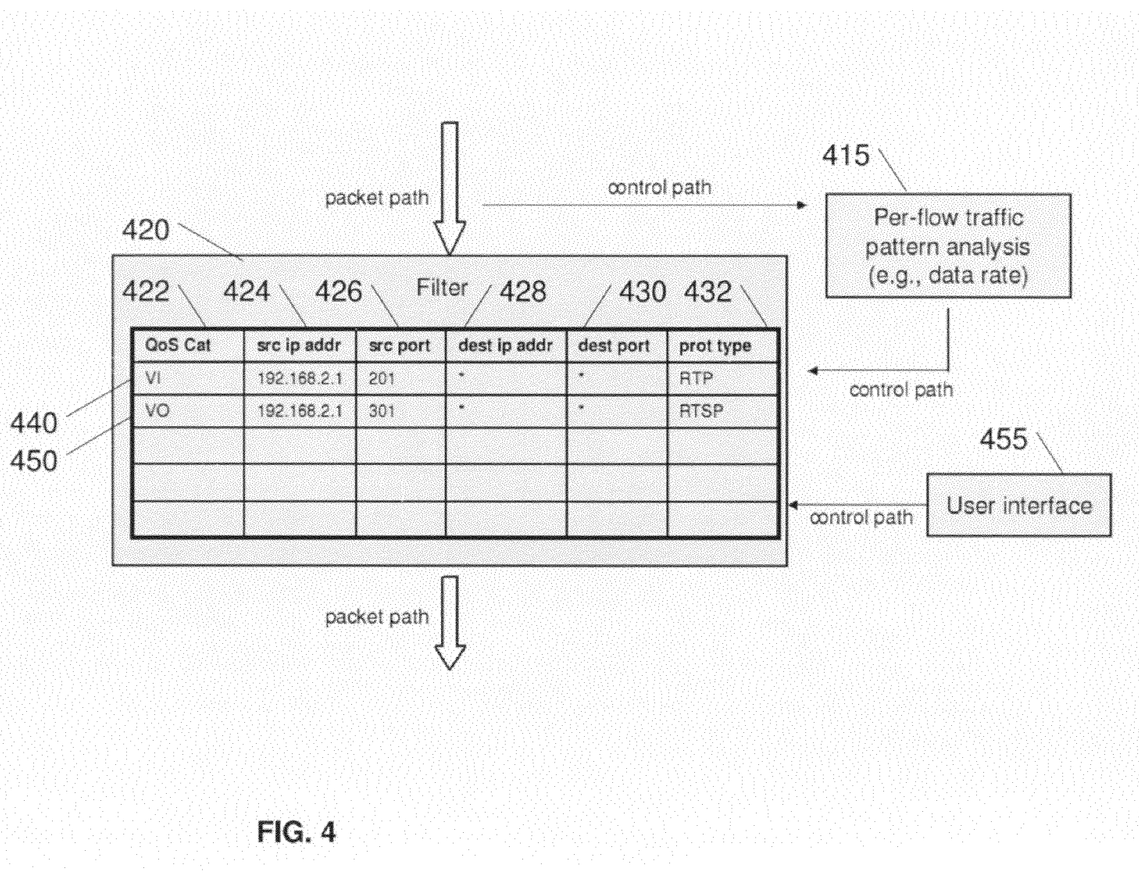
FIG. 4 illustrates how an NNQ prioritization engine may implement QoS policies.

FIG. 4 illustrates how an NNQ prioritization engine may implement QoS policies. For each packet that needs to be transmitted, the prioritization engine may process it using several classification filters, such as filter 420. Initially, the prioritization engine of one or more embodiments may identify a traffic stream using the unique 5-tuple data comprising the source IP address 424, source Transmission Control Protocol (TCP) port address 426, destination IP address 428, destination TCP port address 430, and protocol 432. Using the 5-tuple data to find a match, as illustrated by filter 420 of FIG. 3, is just one embodiment.

Alternative embodiments may employ alternative and/or additional methods to identify the various traffic streams. In other words, determining a 5-tuple match according to FIG. 3 is for illustration of one embodiment. Alternative embodiments are not necessarily limited to examining the 5-tuple data. Further, embodiments may also match other types of traffic, such as matching packets of User Datagram Protocol (UDP) traffic, or other point-to-point traffic, such as peer-to-peer video traffic transmitted wirelessly.

An NNQ prioritization engine may use different filters to check different packet fields. Upon examining a packet and determining that one or more field values match predetermined criteria, the prioritization engine may mark the packet and other packets of the stream to indicate the packets belong to the corresponding QoS access category. For example, if a packet has a source IP address=192.168.2.1, source port number=201, protocol type=Real-time Transport Protocol (RTP), then the prioritization engine may determine that the packet matches a video "VI" QoS category 440 and mark the packet as a VI packet. If a packet has a source IP address=192.168.2.1, source port number=301, and protocol type=Real Time Streaming Protocol (RTSP), then the prioritization engine may determine that the packet matches a voice "VO" QoS category 450 and mark the packet as a VO packet.

Various embodiments may enable adaptive configuration of the packet filters, as the NNQ Engine may identify values by using a per-flow traffic pattern matching mechanism 415. Some embodiments may additionally or alternatively enable manual configuration of the packet filters, such as by using a user interface-based application 455 for the network driver. For embodiments that have an adaptive pattern matching mechanism 415, the embodiments may monitor each connection flow and analyze the traffic flow for a specific pattern. As a specific example, an embodiment may monitor and analyze the traffic flow for a pattern related to packet data rate.

If the prioritization engine determines that a pattern of the traffic flow matches the pattern of a known QoS application or specification, the prioritization engine may add a new filter entry for the flow. For example, a user may own an Ethernet-enabled home stereo system capable of receiving and playing audio content from an Internet radio station. After the user tunes to a specific radio station on the Internet, and after the stereo system has established a wireless communication link with access point 230, a prioritization engine located in access point 230 may analyze the packets of the audio stream, recognize that the packets are being transmitted from a source IP address and a source port number known to be audio content from an Internet radio station, and dynamically add a new entry in filter 420 with a QoS category 422 of "AU", or "VI" if filter 420 does not already have a VI QoS category. With a specific filter entry, access point 230 may prioritize subsequent packets transmitted from the Internet radio station and transmit the prioritized packets before, e.g., lower priority file transfer packets being transmitted to laptop 260.

FIG. 4 illustrates just a few embodiments that enable QoS processing via specific traffic classification criteria. However, alternative embodiments are not limited to the specific traffic classification techniques illustrated in FIG. 4. NNQ prioritization engines of alternative embodiments may use many different forms of traffic classification criteria. An embodiment may classify traffic based on an explicit traffic protocol identifier, such as RTP, RTSP, TCP, and UDP, as examples. An embodiment may identify packets based on ingress and egress traffic streams. An embodiment may determine a traffic flow pattern match based on the use of well-known ports being traffic or control endpoints.

An embodiment may determine a pattern match for a QoS application using packet size, such as recognizing packets having a 64 byte voice pattern. Some embodiments may match the pattern of a QoS application based on packet ingress and egress arrival rates. For example, an embodiment may determine that the number of transmitted frames per second of a stream match a specific transmission standard for standard-definition television (SDTV) or high-definition television (HDTV). Alternatively, an embodiment may determine that the number of transmitted frames per second, transmitted at a rate of once per 20 milliseconds, matches the voice packet transmission rate of a known voice application. Further alternative embodiments may employ deep packet inspection to identify the type of video traffic. For example, an embodiment may employ deep packet inspection to identify video stream fragments, MPEG2 I/P/B frames, SDTV packets, and/or HDTV packets.

As FIGS. 1 through 4 illustrate, an embodiment may allow different applications, including legacy non-QoS applications, to obtain QoS priority on a wireless communication channel. Operations of the prioritization engine may enable QoS packet handling yet eliminate complex QoS negotiations and counter-negotiations, because the networking applications may not be required to establish a QoS priority for packets of the applications.

Figure 5:
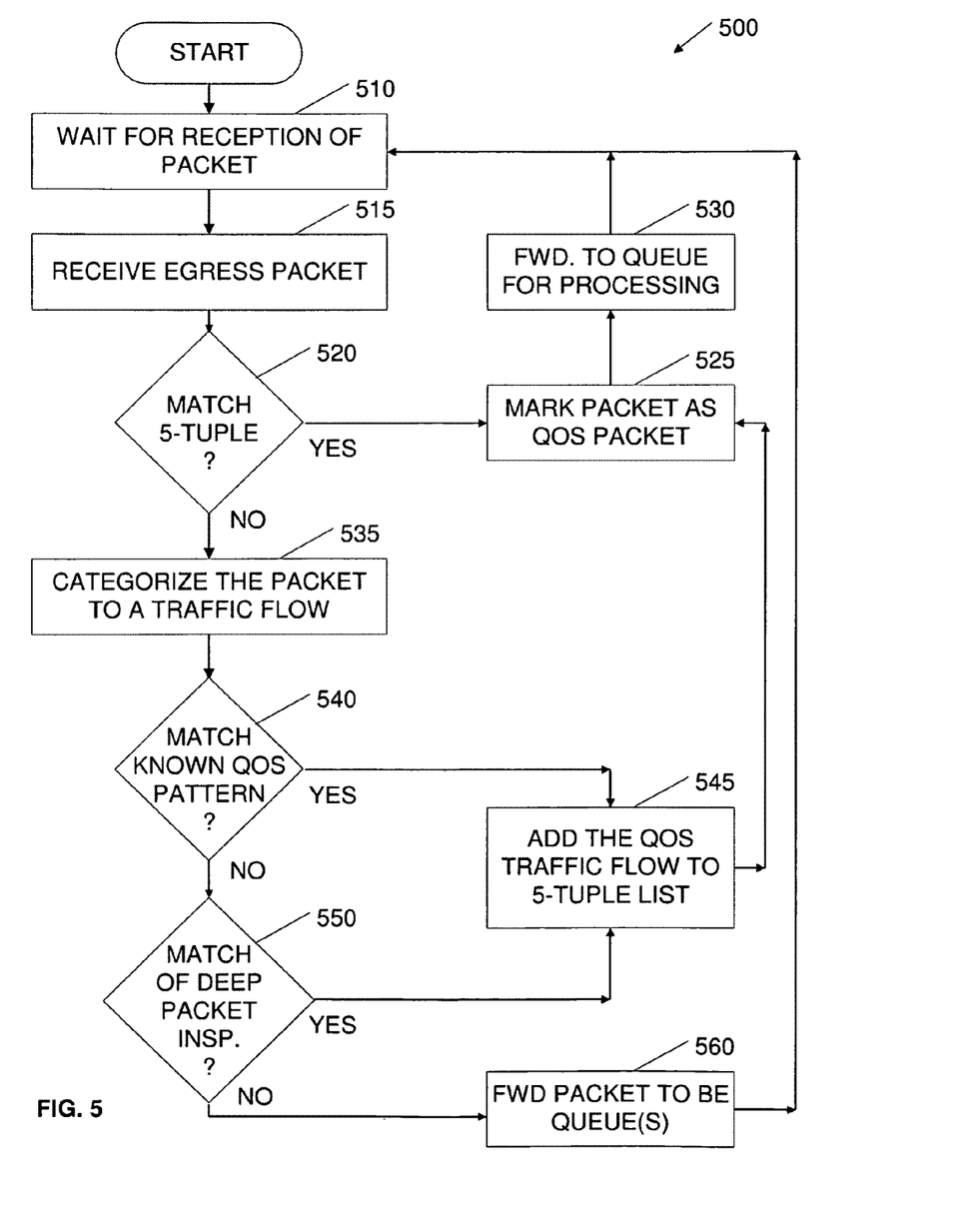
FIG. 5 illustrates a process that an embodiment may employ when receiving, classifying, and forwarding packets in an NNQ environment.

FIG. 5 illustrates a process 500 that an embodiment may employ when receiving, classifying, and forwarding packets in a non-negotiated QoS environment. In an embodiment, a wireless network card and associated driver software may wait for an application to forward one or more packets intended to be wirelessly transmitted to another wireless station (element 510). For the sake of illustration, with reference to FIG. 2, a user of laptop 260 may be downloading a large CD ISO image (International Organization for Standardization compact disc image) from Internet 210 while playing a DVD movie on wireless display 280. The application downloading the ISO image may be a web browsing application, while the application playing a DVD movie may be a multimedia playback application.

When the driver software receives a packet for wireless transmission (element 515), such as from the web browsing application or the multimedia playback application, a prioritization engine of the driver may engage in a number of activities to classify and mark the packet for QoS processing. The prioritization engine may first determine whether one or more values of the 5-tuple set of values of the packet match an entry of a table for a filter (element 520). For example, the prioritization engine may receive an audio-video packet from the multimedia playback application that needs to be transmitted to wireless display 280. The prioritization engine may determine that the destination IP address and destination port of the 5-tuple for the packet match the destination IP address and destination port for wireless display 280. Whenever wireless display 280 was turned on and went through an initialization process, wireless display 280 may have created a peer-to-peer association with laptop 260. As part of the association activities, the network driver software may create an entry in the filter table which establishes that any packets transmitted to a specific port of wireless display 280 are to be video packets and should have a "video" QoS classification category. Using the pre-established entry in the filter table, the prioritization engine may determine the packet is a "video" packet based on the destination IP address and destination port of the packet match.

Upon matching the packet with an established QoS category, the prioritization engine may mark the packet according to the matched QoS category (element 525) and forward the packet to a queue for further processing and transmission (element 530). Continuing with the previous example, the prioritization engine may mark the packet as a "video" or "VI" packet via the packet header and place the packet in a high priority QoS queue. Upon placing the packet in the queue, the embodiment may return to waiting for an application to forward one or packets for wireless transmission (element 510).

If the prioritization engine determines that values of the 5-tuple set for the packet do not match an entry of a table for a filter (element 520), the prioritization engine may then attempt to categorize the packet according to traffic flow data (element 535). One method of categorizing the packet according to traffic flow data may comprise matching traffic flow data of the packet to a known QoS traffic pattern (element 540). An example of matching traffic flow data of the packet to a known QoS traffic pattern may be for an embodiment to compare the source IP address and source port and/or the destination IP address and destination port of the packet with a table of known applications which lists the IP addresses and ports that the applications use. Another example would be for an embodiment to compare the traffic protocol identifier and packet size of the packet with a table of known applications which lists the protocols and packet sizes that the applications use.

Another method of categorizing the packet according to traffic flow data may comprise a more thorough or in-depth analysis of the packet data (element 550). An example of deep packet inspection may comprise the prioritization engine examining data of the packet and identifying a video stream fragment as an HDTV-encoded video segment. If the prioritization engine determines that traffic flow data of the packet matches a known QoS traffic pattern (element 540), or that a deep packet inspection reveals that the packet matches a known QoS traffic pattern (element 550), an embodiment may add a new filter entry for the QoS traffic flow, such as by adding the 5-tuple data of the packet to a filter table (element 545).

Upon adding the QoS traffic flow to the filter (element 545), an embodiment may continue by marking the packet according to the added QoS category (element 525) and forwarding the packet to a queue for further processing and transmission (element 530). Alternatively, if an embodiment is unable to categorize the packet to a traffic flow by matching a known QoS traffic pattern (element 540) or by deep packet inspection (element 550), the embodiment may leave the packet unmarked and forward the packet to one or more BE queues (element 560). Instead of leaving the packet unmarked, an alternative embodiment may create a new low-priority filter entry for the QoS traffic flow, mark the packet according to the newly created QoS category and forward the packet to a queue for further processing and transmission (element 530).

Figure 7:
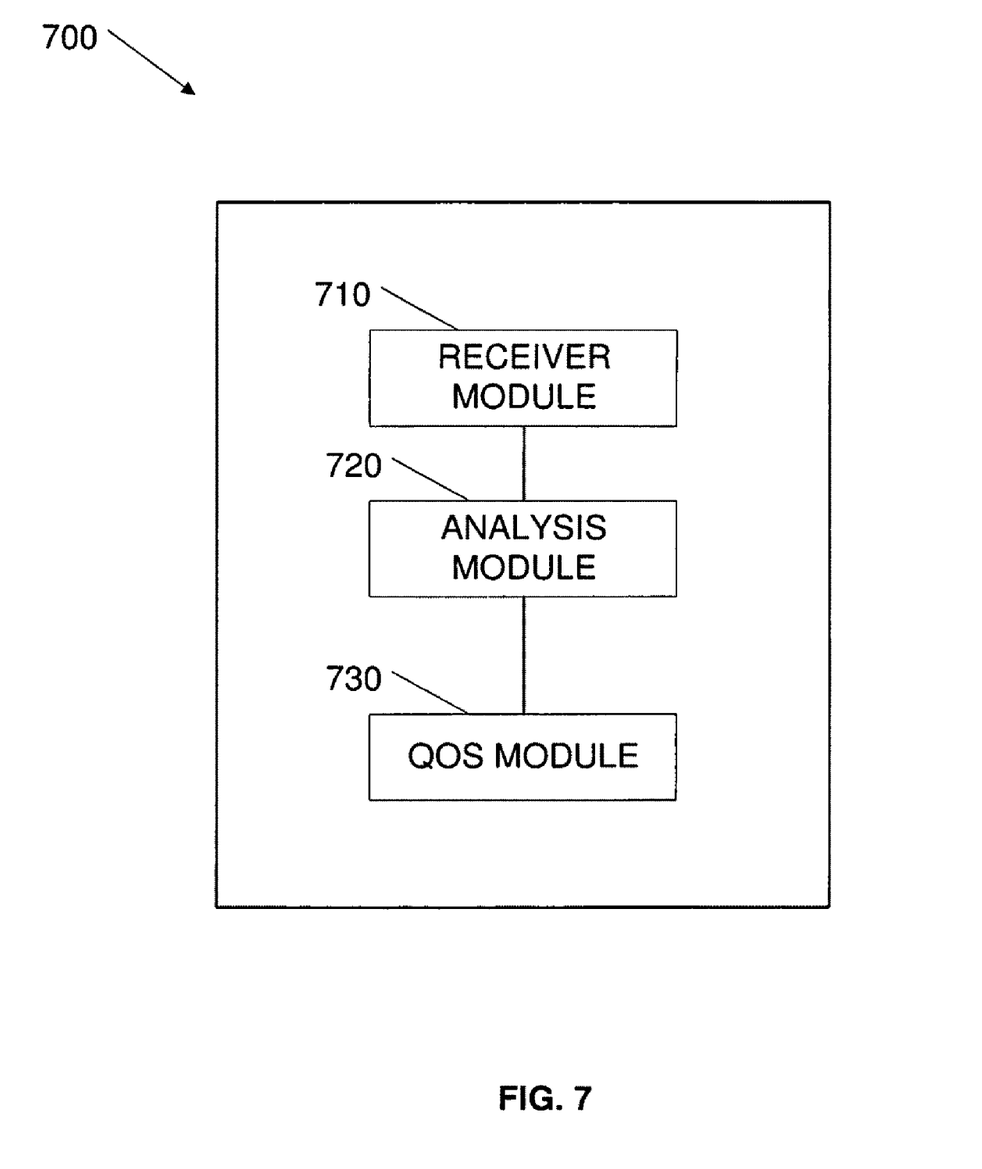
FIG. 7 shows an apparatus that enables QoS processing of wireless traffic without explicit control negotiations.

FIG. 7 depicts one embodiment of an apparatus 700 that may enable QoS processing of wireless traffic without explicit control negotiations in a wireless network. One or more elements of apparatus 700 may be in the form of hardware, software, or a combination of both hardware and software. For example, in the embodiment depicted in FIG. 7, the modules of apparatus 700 may exist as instruction-coded modules stored in a memory device. For example, the modules may comprise software or firmware instructions of an application, executed by a processor of a network interface card, wherein the NIC is part of a computing system. In other words, apparatus 700 may comprise elements of a station in a wireless network.

In alternative embodiments, one or more of the modules of apparatus 700 may comprise hardware-only modules. For example, receiver module 710 and analysis module 720 may comprise a portion of an integrated circuit chip, comprising memory elements and a state machine, in a computing device. In such embodiments, the memory elements of receiver module 710 may work in conjunction with the state machine of analysis module 720, buffering data of received packets until analysis module 720 may analyze the packets for QoS marking.

Receiver module 710 may receive and buffer header and payload data for packets to be transmitted from apparatus 700. For example, receiver module 710 may comprise memory elements coupled to a wireless antenna in a network interface card. In one embodiment, receiver module 710 may receive payload data from a networking application, such as a multimedia application generating packets for wireless transmission to another station of the wireless network, such as wireless display 280 in FIG. 2.

The networking application may indicate to apparatus 700 which bytes of data, or payload, are to be transferred. Further, the networking application may specifically instruct apparatus 700, by transferring header data to apparatus 700, that the payload data should be transferred using BE QoS processing. For example, the networking application may transfer packet setup data and other parameters or settings, along with the payload data, to receiver module 710. The setup data or other parameters may enable QoS module 730 to assemble the header data and the payload data of the packet based on the setup data or other parameters. Alternatively, the networking application may not specify a particular QoS category for the payload data, wherein QoS module 730 may default to the BE QoS when assembling or creating the header data.

Figure 6B:
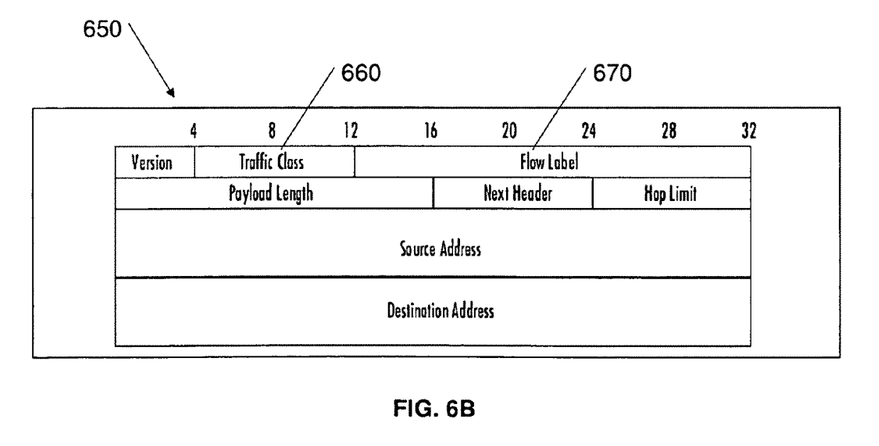
FIG. 6B depicts an Internet protocol (IP) version 6 (IPv6) header.

Worth emphasizing for clarity, the term "header data" may refer to the bytes of data which are transmitted immediately preceding the payload data of the packet. For example, header data may comprise word #0 through word #14 in FIG. 6A, or the 40 bytes of IPv6 header 650 depicted in FIG. 6B. Additionally, the term "header data" may refer to the data provided by a networking application that is used to assemble the header of the packet. For example, the networking application may specify certain transmission parameters or settings, such as "QoS_AC=BE", whereupon QoS module 730 may use the parameters to create the packet header, such as by setting the bits of DiffServ field 610.

Analysis module 720 may work in conjunction with receiver module 710 to analyze the header data of the packet, the payload data of the packet, or both. For example, analysis module 720 may comprise processor 150 executing coded instructions, stored in memory 102, of a driver for communication device 192. Receiver module 710 may comprise a buffering memory element coupled to the receiving circuitry of communication device 192. The networking application may comprise a softphone application stored in memory 102 and being executed by processor 150. After receiver module 710 receives a packet of data from the softphone application, a prioritization engine of analysis module 720 may first determine whether one or more values of the 5-tuple set of values of the packet match an entry of a filter table. Based upon a match with a pre-established entry in the filter table, the prioritization engine may determine the packet is a "voice" packet based on the destination IP address and destination port of the packet match.

Upon determining a match with an existing QoS access category, QoS module 730 may mark the packet to enable QoS handling of the packet via stations of the wireless network, which includes a station that comprises apparatus 700. Continuing with our example, QoS module 730 may comprise a component of the prioritization engine and driver for communication device 192. Based on the match with the "voice" (VO) QoS access category, QoS module 730 may mark the packet as a "VO" packet via the packet header and place the packet in a high priority "VO" QoS queue. For example, QoS module 730 may set bits in DiffServ field 610, illustrated in FIG. 6A, or in the Traffic Class field 660 and/or Flow Label field 670, illustrated in FIG. 6B.

The number of modules in an embodiment of apparatus 700 may vary. Some embodiments may have fewer modules than those module depicted in FIG. 7. For example, one embodiment may integrate the functions described and/or performed by analysis module 720 with the functions of QoS module 730 into a single module. Further embodiments may include more modules or elements than the ones shown in FIG. 7. For example, alternative embodiments may include two or more receiver modules 710 and two or more analysis modules 720.

Apparatus 700 may comprise a component in a station of an 802.11e or legacy 802.11 wireless communication network. By default, stations of a wireless LAN may operate in a Constant Access Mode (CAM) which means that the stations are always on listening for traffic. To save power, such as when a system containing apparatus 700 comprises a battery-powered device like a hand-phone or other portable device, apparatus 700 may trigger the release of buffered data from an access point by sending an uplink data frame. Upon receipt of such data, or trigger frame, the AP may release previously buffered data stored in each of its queues. Queues may be configured to be trigger-enabled, such as by the receipt of a data frame corresponding to the queue which acts as a trigger, and delivery-enabled, such as by releasing data stored at the queues upon receipt of a frame.

Further, a system comprising apparatus 700 may enter a sleep mode called Polled Access Mode (PAM) without losing frames. In PAM, the AP may buffer packets due for apparatus 700 until the system comes out of sleep mode. The AP may send out the information on which the system and other stations have frames due to them within frames called Traffic Information Maps (TIM). A client may receive the TIMs and wake just long enough to receive whatever frames have been buffered for the client before the client goes back to sleep. If broadcast traffic is available then the AP may send a Delivery Traffic Information Map (DTIM).

Another embodiment is implemented as a program product for implementing systems and methods described with reference to FIGS. 1-7. Embodiments can take the form of an entirely hardware embodiment, an entirely software embodiment, or an embodiment containing both hardware and software elements. One embodiment is implemented in software, which includes but is not limited to firmware, resident software, microcode, etc.

Furthermore, embodiments can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The medium can be an electronic, magnetic, optical, electromagnetic, infrared, or semiconductor system for apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disc-read only memory (CD-ROM), compact disc-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem, and Ethernet adapter cards are just a few of the currently available types of network adapters.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

It will be apparent to those skilled in the art having the benefit of this disclosure that the present disclosure contemplates QoS processing of wireless traffic without explicit control negotiations, for communication devices associated with wireless networks. It is understood that the form of the embodiments shown and described in the detailed description and the drawings are to be taken merely as examples. It is intended that the following claims be interpreted broadly to embrace all variations of the example embodiments disclosed.

Although the present disclosure has been described in detail for some embodiments, it should be understood that various changes, substitutions, and alterations can be made herein without departing from the spirit and scope of the disclosure as defined by the appended claims. Although specific embodiments may achieve multiple objectives, not every embodiment falling within the scope of the attached claims will achieve every objective. Moreover, the scope of the present application is not intended to be limited to the particular embodiments of the process, machine, manufacture, composition of matter, means, methods, and steps described in the specification. As one of ordinary skill in the art will readily appreciate from this disclosure, processes, machines, manufacture, compositions of matter, means, methods, or steps presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
receiving, by an element of a first station, header data and payload data from a networking application, wherein the payload data is to be transmitted in a packet to a second station via a wireless transmitter of the first station, and wherein the header data specifies that the packet is associated with a first quality of service (QoS) category;
analyzing, by the first station, at least one of the header data or the payload data and at least one of an arrival rate of packets of the networking application received by the first station and an egress rate of packets of the networking application transmitted from the first station to the second station; and
setting, by the first station, at least one bit of the header data based on the analyzing, wherein the setting is to mark the packet and associate the packet with a second QoS category, wherein the priority of the second QoS category is higher than the priority of the first QoS category.

2. The method of claim 1, wherein the receiving the header data and the payload data comprises receiving the packet from a third station, wherein the networking application comprises a voice over Internet protocol (VoIP) application, wherein further the third station comprises a server of the Internet and wherein associating the packet with a second QoS category comprises associating the packet with a voice (VO) access category.

3. The method of claim 1, wherein the setting the at least one bit of the header data comprises associating the packet with a voice (VO) access category, wherein further the first QoS category comprises a best effort (BE) access category.

4. The method of claim 1, further comprising changing power states by the first station based upon the second QoS category and based upon the analyzing the at least one of the arrival rate of packets and the egress rate of packets.

5. A computer program product comprising: a non-transitory computer readable medium having a computer readable program code embodied therewith, the computer readable program code comprising: computer readable program code configured to perform operations, the operations comprising:

receiving header data and payload data from a networking application, wherein the payload data is to be transmitted in a packet to a station via a wireless transmitter, wherein the header data specifies that the packet is associated with a first quality of service (QoS) category;

analyzing the header data or the payload data to associate the packet with a second QoS category, wherein the priority of the second QoS category is higher than the priority of the first QoS category;

setting at least one bit of the header data based on the analyzing, wherein the setting is to mark the packet and associate the packet with the second QoS category; and enabling a system of the computer program product to change power states based on at least one of an arrival rate of packets received by the system and an egress rate of packets transmitted from the system.

6. The computer program product of claim 5, wherein the setting the at least one bit comprises associating the packet with one of a voice (VO) access category and a video (VI) access category, wherein further the first QoS category comprises a best effort (BE) access category.

7. The computer program product of claim 5, wherein the non-transitory computer readable medium comprises non-volatile memory of a network interface card (NIC).

8. An apparatus, comprising:
a receiver module to receive, by an element of a first station, header data and payload data from a networking application, wherein the payload data is to be wirelessly transmitted in a packet to a second station, and wherein the header data specifies that the packet is associated with a first quality of service (QoS) category;

an analysis module to analyze by the first station at least one of the header data or the payload data and at least one of an arrival rate of packets of the networking application received by the first station and an egress rate of packets of the networking application transmitted from the first station to the second station; and a QoS module to mark the packet, based on the analysis, by setting at least one bit of the header data, wherein the marking of the packet changes the association of the packet from the first QoS category to a second QoS category, wherein further the second QoS category is a higher priority category than the first QoS category.

9. The apparatus of claim 8, wherein the receiver module comprises dynamic random access memory (DRAM) and the analysis module comprises a microprocessor configured to execute firmware instructions for the analyzing of the at least one of the arrival rate of packets and the egress rate of packets.

10. The apparatus of claim 8, wherein:
the apparatus comprises a mobile computing device; and
the analysis module and the QoS module comprise a prioritization engine of a driver of a wireless communication device of the mobile computing device.

11. The apparatus of claim 10, wherein the analysis module is configured to place the packet in one queue of a plurality of queues according to the second QoS category, wherein further the QoS module is configured to adaptively update entries of a filter based on analyses of the analysis module.

12. The apparatus of claim 11, wherein:
the analysis module is configured to analyze the header data and match the packet with the second QoS category based on at least one traffic classification criterion, and the classification criterion comprises one of a protocol identifier, a source or destination port, packet size, and packet rate.

13. The apparatus of claim 8, wherein the analysis module is configured to enable the apparatus to enter a power conservation mode based upon the second QoS category.

14. The apparatus of claim 13, wherein the analysis module is configured to enable the apparatus to enter a power conservation mode based upon the second QoS category and based upon the analysis of the at least one of the arrival rate of the packets and the egress rate of packets.

15. The apparatus of claim 14, wherein the power conservation mode comprises a Polled Access Mode (PAM), and wherein the receiver module is configured to buffer packets while in the PAM.

16. The apparatus of claim 13, wherein the second QoS category comprises a voice (VO) access category.

17. A system, comprising:
a wireless communication device coupled to an antenna, the antenna configured to transmit a packet to a station of a wireless communication network, wherein the packet comprises header data and payload data; wherein further a networking application associates the packet to a first quality of service (QoS) category;

dynamic random access memory (DRAM) to store coded instructions of a prioritization engine of a driver of the wireless communication device; and a processor coupled to the DRAM, the processor to execute the coded instructions to analyze at least one of the header data or the payload data and to mark the packet, wherein the marking is to change an association of the packet from the first QoS category to a second QoS category based on the analysis, wherein the second QoS category comprises a voice (VO) access category.

18. The system of claim 17, wherein:
the processor is further to execute the coded instructions to analyze at least one of an arrival rate of packets of the networking application received by the wireless communication device and an egress rate of packets of the networking application transmitted from the wireless communication device to the station; and the analysis of the at least one of the header data and payload data and the analysis of the at least one of the arrival rate and the egress rate comprise comparison of the packet to at least one of a number of packet criteria, the packet criteria comprising packet protocol, packet size, a port number, a packet IP address, a packet ingress rate, and a packet egress rate.

19. The system of claim 17, wherein the processor is to switch to a power conservation mode based upon an analysis of at least one of an arrival rate of packets of the networking application received by the wireless communication device and an egress rate of packets of the networking application transmitted from the wireless communication device to the station.

20. The system of claim 19, wherein the processor is to switch to a power conservation mode based upon the VO access category and based upon an analysis of at least one of an arrival rate of packets of the networking application received by the wireless communication device and an egress rate of packets of the networking application transmitted from the wireless communication device to the station.

* * * * *